US009765720B2

(12) United States Patent
Koch et al.

(10) Patent No.: US 9,765,720 B2
(45) Date of Patent: Sep. 19, 2017

(54) METHOD FOR AVOIDING INCORRECT COMBUSTION MISFIRE FAULT DETECTION IN A MOTOR VEHICLE

(71) Applicant: Bayerische Motoren Werke Aktiengesellschaft, Munich (DE)

(72) Inventors: Manuel Koch, Munich (DE); Sandra Kustermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 317 days.

(21) Appl. No.: 14/539,186

(22) Filed: Nov. 12, 2014

(65) Prior Publication Data

US 2015/0135810 A1     May 21, 2015

(30) Foreign Application Priority Data

Nov. 15, 2013   (DE) ......................... 10 2013 223 396

(51) Int. Cl.
*F02D 41/14*     (2006.01)
*G01M 15/11*    (2006.01)
*F02D 41/12*    (2006.01)

(52) U.S. Cl.
CPC ....... *F02D 41/1498* (2013.01); *F02D 41/123* (2013.01); *G01M 15/11* (2013.01); *F02D 2200/1015* (2013.01)

(58) Field of Classification Search
CPC ........... F02D 2200/1015; G01M 15/11; G01M 15/046

(Continued)

(56) References Cited

U.S. PATENT DOCUMENTS 6,470,854 B1 * 10/2002 Hirata ................... F02D 31/005
                                                                    123/436
2009/0063024 A1    3/2009  Katayama
2012/0037120 A1    2/2012  Dietl

FOREIGN PATENT DOCUMENTS

CN           101163874 A        4/2008
CN           101522500 A        9/2009
(Continued)

OTHER PUBLICATIONS

DE 102011085212 English machine translation from Espacenet.*
(Continued)

*Primary Examiner* — Daniel S Larkin
*Assistant Examiner* — Anthony W Megna Fuentes
(74) *Attorney, Agent, or Firm* — Crowell & Moring LLP

(57) ABSTRACT

A method is provided for avoiding incorrect combustion misfire fault detection in an internal combustion engine in a motor vehicle with a dual mass flywheel. In order to detect combustion misfiring, a characteristic variable, which is dependent on the acceleration of the internal combustion engine, is determined continuously during the ongoing operation of the internal combustion engine and compared with a predefined irregular running threshold value. When the irregular running threshold value is exceeded, a combustion misfire is detected, wherein the frequency of detected combustion misfiring, for example at a specific number of crank shaft revolutions, is detected. When a defined frequency threshold is exceeded, a combustion misfire fault detection is activated. When a dual mass flywheel bounce is detected with the simultaneous detection of combustion misfiring, the injection of at least one cylinder is reduced or switched off for a predefined frequency or for a predefined time.

10 Claims, 2 Drawing Sheets

(58) Field of Classification Search
USPC .............................. 73/114.03–114.05, 114.07
See application file for complete search history.

(56) References Cited

FOREIGN PATENT DOCUMENTS

| | | |
|---|---|---|
| CN | 102004037 A | 4/2011 |
| DE | 10 2008 050 287 A1 | 4/2009 |
| DE | 10 2009 013 409 A1 | 10/2009 |
| DE | 10 2009 018 081 A1 | 11/2010 |
| DE | 10 2009 049 544 A1 | 4/2011 |
| DE | 10 2011 109 084 A1 | 2/2013 |
| DE | 10 2011 109 086 A1 | 2/2013 |
| DE | 10 2011 085 212 A1 | 5/2013 |
| DE | 102011085212 A1 * | 5/2013 ......... F02D 41/1498 |

OTHER PUBLICATIONS

Chinese Office Action issued in counterpart Chinese Application No. 201410645975.X dated Jul. 13, 2016 with English translation (eight pages).

German Search Report dated Jan. 8, 2014 with partial English translation (10 pages).

\* cited by examiner

METHOD FOR AVOIDING INCORRECT COMBUSTION MISFIRE FAULT DETECTION IN A MOTOR VEHICLE

CROSS REFERENCE TO RELATED APPLICATION

This application claims priority under 35 U.S.C. §119 from German Patent Application No. 10 2013 223 396.5, filed Nov. 15, 2013, the entire disclosure of which is herein expressly incorporated by reference.

BACKGROUND AND SUMMARY OF THE INVENTION

The invention relates to a method for avoiding incorrect combustion misfire fault detection in a motor vehicle with a dual mass flywheel.

Legal regulations (for example, in the USA) require the internal combustion engine of a motor vehicle to be monitored for combustion misfires. Since a combustion misfire or a main exciting ignition order contributes to a low frequency order at the crank shaft encoder wheel, prior art detection methods attempt to determine low frequency oscillations at the crank shaft encoder wheel of the engine. This is currently carried out by evaluating the crank shaft signal. In this context, the times at which defined angular segments of the current cylinder pass through are compared with the times when other cylinders pass through. If the segment time is exceeded repeatedly, an ignition misfire or combustion misfire is determined and a fault entry is made in the control unit.

An example of such a detection method is disclosed in DE 10 2011 085 212 A1. In this method for avoiding incorrect combustion misfire fault detection, initially, in order to detect (individual) combustion misfires, a characteristic variable which is dependent on the acceleration of the internal combustion engine is determined continuously by a first monitoring method during the ongoing operation of the internal combustion engine and is compared with a predefined variable threshold value. If the corresponding threshold value is exceeded by the determined characteristic variable, a combustion misfire is said to be detected. The characteristic variable (irregular running) can be, for example, the time when defined angular segments pass through.

Since the low frequency oscillations of the crank shaft encoder wheel, which are detected by the known method, can occur not only in the case of ignition misfires and combustion misfires, but also as a result of operating time specific drive train oscillations, the operating point specific oscillations of the drive train should not be taken into account or should not be detected as combustion misfires. For example, in what is referred to as the float operating point at which a torque about the zero load is generated (i.e. the driver requests an engine torque which is equal to or slightly higher than the engine's own drag torque), the low frequency oscillations by the drive train can reach the same order of magnitude as the oscillations caused by combustion misfires.

With the known method it is possible to differentiate fluctuations in the rotational speed which are caused by combustion misfires from fluctuations in the rotational speed which result from an operationally induced drive train oscillation. This occurs, here, in such a way that pre-conditioning of the drive train is detected in the engine controller by way of a second monitoring method, during which pre-conditioning low frequency oscillations can occur at critical motor vehicle operating points owing to drive train oscillations. During detection of such pre-conditioning, an increase in the threshold value is subsequently carried out, with the result that these operationally induced oscillations of the drive train are not incorrectly detected as combustion misfires. Therefore, if a driving maneuver with corresponding pre-conditioning is detected, the threshold value for the misfire detection for this critical operating point of the internal combustion engine is corrected upward in order to avoid the incorrect detection of misfires. If the critical operating points are passed through without pre-conditioning, the original threshold value is retained and the threshold value is not adapted. The range in which the pre-conditioning or the critical excitation takes place is dependent on the torque range and rotational speed range and can be determined within the scope of simulations or during vehicle trials. The level of the raising of the threshold value can be determined, for example, in advance by way of measurements and stored in a characteristic diagram.

Such pre-conditioning during which an increase in the threshold value is carried out, occurs, for example, when the bow springs which are arranged in a dual mass flywheel are prestressed. If the bow springs are prestressed and if, at the same time, a high rotational speed is present, it is not possible to relieve the stress of the bow springs. As a result, in the case of low torques bounce processes may occur in the dual mass flywheel, which in turn leads to oscillations at the crank shaft. If the threshold value were to be retained, combustion misfires would be incorrectly detected. Therefore, incorrect detection of combustion misfires can be reduced in such critical driving situations by increasing the threshold value.

Finally, the threshold value is reduced to the normal value or the increase is advantageously canceled out if the critical motor vehicle operating point is exited again and/or if the pre-conditioning is ended.

The object of the invention is to provide a method for avoiding incorrect combustion misfire fault detection which is improved compared to the prior art.

This and other objects are achieved according to the invention by providing a method for avoiding incorrect combustion misfire fault detection in an internal combustion engine in a motor vehicle with a dual mass flywheel. In order to detect combustion misfires, a characteristic variable (irregular running), which is dependent on the acceleration of the internal combustion engine, is determined continuously during the ongoing operation of the internal combustion engine and compared with a predefined irregular running threshold value. When the irregular running threshold value is exceeded, a combustion misfire is detected, wherein the frequency of detected combustion misfires (for example, at a specific number of crank shaft revolutions) is detected, and when a defined frequency threshold is exceeded, a combustion misfire fault detection is activated. According to the invention, basically when a dual mass flywheel bounce is detected with the simultaneous detection of combustion misfires, the injection of at least one cylinder (but preferably all the cylinders) is reduced for a predefined frequency or for a predefined time (at least once). The reduction of the injection can also be a complete switching off of the injection.

The invention is based on the following.

So called dual mass flywheel (DMF) bounce is a problem which has been known in the area of internal combustion engines since the introduction of the dual mass flywheel. A DMF is used for acoustic reasons. For example, hard engagement after a reverse gear shift operation or during a clutch engagement process in the same gear can cause the bow spring in the DMF to be tightened. If the engine is then operated with a positive load, DMF bounce can occur in specific characteristic rotational speed load ranges. The bounce brings about increased irregular running, which can be misinterpreted as combustion misfires by the sensor system. This incorrect detection of combustion misfires can result in cylinder shut off and the starting of an emergency running program (for example, with torque reduction).

A mechanical solution to this problem would be possible, but is unfavorable for reasons of cost and space.

The bouncing of the dual mass flywheel can already be detected by known methods. According to the invention, basically after a DMF bounce has been detected with the simultaneous detection of (individual) combustion misfires, an injection reduction is carried out, preferably injection shut off. The (known) "combustion misfire fault detection" waits for a reaction (for example, fault entry, cylinder shut off, etc) for a predefined frequency of individual combustion misfires (instances of the threshold value being exceeded). The term "combustion misfire fault detection" is therefore understood to mean the exceeding of the threshold value in respect of the frequency of individual combustion misfires (frequency threshold value). The combustion misfire fault detection is therefore to be differentiated from the detection of (individual) combustion misfires. The injection reduction according to the invention is preferably carried out after a predefined pre-threshold value relating to the frequency of the detection of combustion misfires is reached, but before the "combustion misfire fault detection". The detection of a combustion misfire is usually carried out by the known irregular running measurement by way of the sensor system in order to measure the engine speed.

The injection reduction results in a negative load surge (=torque surge) which relieves the bow springs of the DMF of stress. The injection is preferably reduced or suppressed at least once at all the cylinders so that the negative load surge is as strong as possible and therefore reliably performs its purpose. In order to increase the load surge, a brief increase in the torque can be carried out before the injection reduction in one development of the invention.

The invention provides a cost effective and reliable method for avoiding incorrectly detected combustion misfires since the bounce itself is therefore ended before the combustion misfire fault detection responds.

This method provides the following advantages. A significant advantage is the fact that the implementation of the function does not give rise to any significant costs since no additional hardware components are necessary. Instead, an internal damper, which would otherwise be necessary in the dual mass flywheel (and which is intended to reduce the oscillations) can even be dispensed with. As a result, there can in turn be a savings both in terms of cost and in weight.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
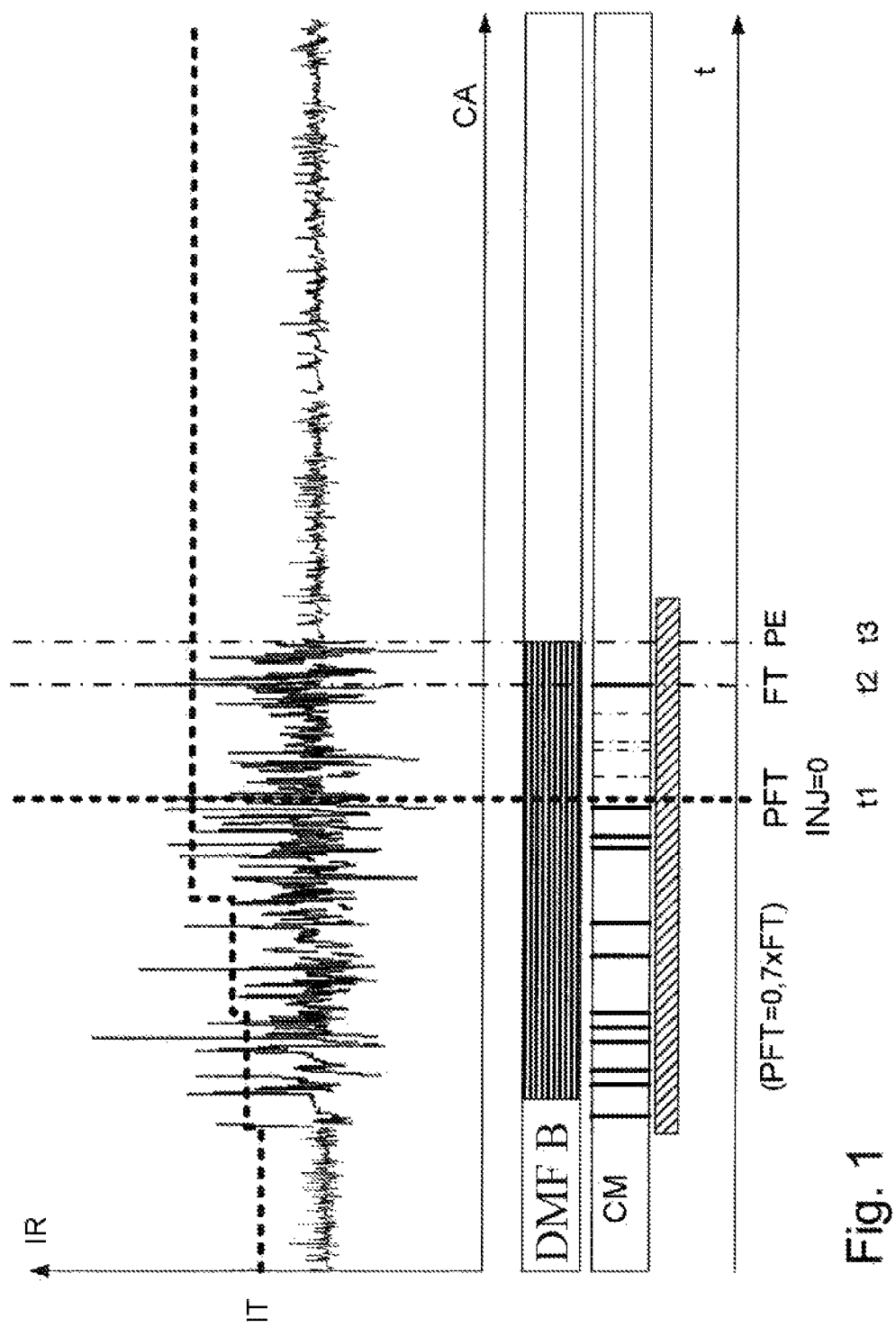
FIG. 1 is a graphical diagram in which the irregular running is plotted against time.

FIG. 1 illustrates a diagram in which the irregular running (IR) is plotted against the crank shaft angle (CA). Here, significantly increased irregular running (IR) is measured during a dual mass flywheel bounce (DMF B). The irregular running (IR) exceeds the irregular running threshold value (IT) repeatedly. In this context, a combustion misfire (CM) is detected every time. Each combustion misfire (CM) is counted by use of a predefined evaluation window (see hatched bar, for example over 200 crank shaft revolutions) and is preferably also weighted. This frequency of the combustion misfire (CM), which is acquired in this way, is compared with a defined frequency threshold value (FT). If this frequency threshold value (FT) were reached, a combustion misfire fault detection (CMFD) would therefore occur, resulting in a fault program.

According to the invention, when a dual mass flywheel bounce (DMF B) is detected n times with the simultaneous detection of combustion misfires (CM), the injection INJ of preferably all the cylinders of the internal combustion engine is reduced (INJ=0). Here, for example, this is done in the form of a complete shut off. The predefined frequency n times can be predefined in a variable fashion by the engine speed and/or by the engine torque.

The start (INJ=0) of the injection reduction can be predefined in every case before the frequency threshold (FT) for the combustion misfire fault detection (CMFD) is reached. The start (INJ=0) of the injection reduction is preferably predefined when a pre-frequency threshold (PFT) is reached, wherein the pre-frequency threshold (PFT) is formed, for example, by multiplying the frequency threshold (FT) by a defined factor which is between 0 and 1. This factor can be determined empirically and predefined permanently. However, it can also be predefined in a variable fashion as a function of operating parameters of the internal combustion engine.

Figure 2:
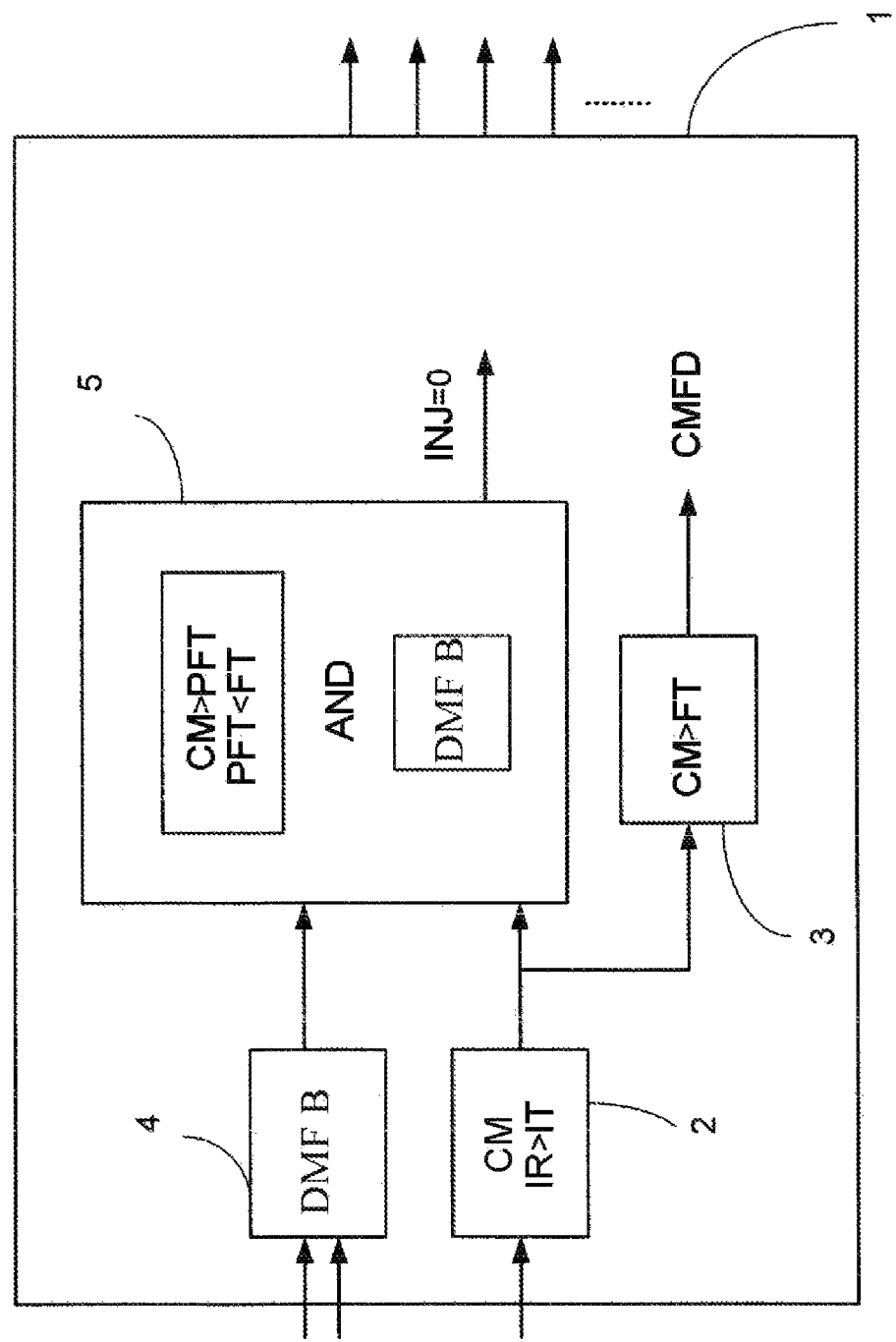
FIG. 2 is a schematic block logic diagram of the system according to an embodiment of the invention.

Components for carrying out the method described with respect to FIG. 1 are illustrated schematically in FIG. 2. An electronic control unit 1, which is present in any case in the motor vehicle and has the purpose of controlling the internal combustion engine, is expanded with functional modules that are connected to one another. The control unit 1 contains:

(a) a first monitoring module 2 for detecting combustion misfires (CM) by way of the irregular running threshold value (IT), (b) a second monitoring module 3 for combustion misfire fault detection (CMFD) by use of the frequency threshold (FT), (c) a third monitoring module 4 for detecting the dual mass flywheel bounce (DMF B) and (d) a control module 5 for reducing or switching off the injection (INJ) of at least one cylinder for a predefined frequency or for a predefined time.

Within the scope of the investigations other software based solutions have also been devised. On the one hand there is the possibility of avoiding (or prohibiting) the critical load range at which there is a risk of DMF bounce. However, this has proven unfeasible since it brings about unreproducible driving behavior on the part of the driver.

On the other hand, load surges due to rapid successive raising and lowering of the load have been investigated. Load is understood to be, in particular, the engine torque. In order to raise and lower the load it is possible, as mentioned above, to increase the torque briefly before the frequency threshold for the combustion misfire fault detection is reached and before the injection reduction. However, in this context a maximum permissible increase in torque has to be defined in order to avoid undesired accelerations of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for avoiding incorrect combustion misfire fault detection in an internal combustion engine of a motor vehicle having a dual mass flywheel, the method comprising the acts of: determining continuously a characteristic variable dependent on an acceleration of the internal combustion engine during operation of the internal combustion engine; comparing the characteristic variable with a predefined irregular running threshold value; detecting a combustion misfire when the characteristic variable exceeds the predefined irregular running threshold value; determining a frequency of detected combustion misfires; activating a combustion misfire fault detection when the frequency of the detected combustion misfires exceeds a defined frequency threshold; and reducing or switching-off a fuel injection of at least one cylinder of the internal combustion engine for a predefined frequency or for a predefined time when a dual mass flywheel bounce is detected simultaneously with the combustion misfires.

2. The method according to claim 1, wherein before carrying out the act of reducing or switching-off the injection, increasing an engine torque to provide a torque surge to counter the dual mass flywheel bounce.

3. The method according to claim 1, wherein the act of reducing or switching-off the injection is carried out by reducing or switching-off the injection of all cylinders of the internal combustion engine at least once.

4. The method according to claim 1, wherein the act of reducing or switching-off the injection is carried out by reducing or switching-off the injection of all cylinders of the internal combustion engine with a predefined frequency, the predefined frequency being variably defined as a function of engine speed and/or engine torque.

5. The method according to claim 1, wherein a start of the reduction of the injection is predefined for the defined frequency threshold when the combustion misfire fault detection is activated.

6. The method according to claim 1, wherein a start of the reduction of the injection is predefined when a pre-frequency threshold is reached, the pre-frequency threshold being formed by multiplying the defined frequency threshold by a factor between zero and one.

7. The method according to claim 6, wherein the factor between zero and one is variable as a function of at least one operating parameter of the internal combustion engine.

8. The method according to claim 1, wherein a start of the reduction of the injection is predefined when a pre-frequency threshold is reached, the pre-frequency threshold being formed by a parameterizable interval before the defined frequency threshold is reached.

9. The method according to claim 8, wherein the parameterizable interval is a fixed value.

10. A system for avoiding incorrect combustion misfire fault detection in an internal combustion engine of a motor vehicle having a dual mass flywheel, the system comprising: an electronic control unit configured to control the internal combustion engine, said electronic control unit being programmed to function as: a first monitoring module that detects combustion misfiring via an irregular running threshold value; a second monitoring module that performs combustion misfire fault detection via a frequency threshold; a third monitoring module that detects bounce of the dual mass flywheel; and a control module that reduces or switches-off a fuel injection of at least one cylinder of the internal combustion engine for a predefined frequency or for a predefined time when the bounce of the dual mass flywheel is detected simultaneously with the detection of combustion misfires.

* * * * *